(12) United States Patent
Wang

(10) Patent No.: US 6,281,942 B1
(45) Date of Patent: Aug. 28, 2001

(54) SPATIAL AND TEMPORAL FILTERING MECHANISM FOR DIGITAL MOTION VIDEO SIGNALS

(75) Inventor: Albert S. Wang, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/909,202

(22) Filed: Aug. 11, 1997

(51) Int. Cl.[7] .............................. H04N 5/21; H04N 5/213; H04N 5/217

(52) U.S. Cl. ..................... 348/607; 348/606; 348/624; 348/620

(58) Field of Search ................................ 348/606, 607, 348/608, 620, 624, 431.1, 451, 452, 610; 382/260, 262, 264; H04N 5/21, 5/213, 5/217

(56) References Cited

U.S. PATENT DOCUMENTS

| | | | | |
|---|---|---|---|---|
| 4,675,532 | * | 6/1987 | Carson | 348/294 |
| 4,750,367 | * | 6/1988 | Bernatets | 73/602 |
| 4,814,629 | * | 3/1989 | Arnold | 250/578 |
| 4,827,533 | * | 5/1989 | Tanaka | 382/262 |
| 4,941,190 | * | 7/1990 | Joyce | 382/264 |
| 4,982,280 | * | 1/1991 | Lyon et al. | 348/448 |
| 5,091,925 | * | 2/1992 | Haendle et al. | 378/98.2 |
| 5,253,045 | * | 10/1993 | Lippel | 348/606 |
| 5,309,237 | * | 5/1994 | Singh | 348/607 |
| 5,329,314 | * | 7/1994 | Correa et al. | 348/448 |
| 5,335,019 | * | 8/1994 | Herz et al. | 348/607 |
| 5,555,028 | * | 9/1996 | Kim | 348/607 |
| 5,561,724 | * | 10/1996 | Kido et al. | 382/264 |
| 5,592,231 | * | 1/1997 | Clatanoff et al. | 348/452 |
| 5,764,307 | * | 6/1998 | Ozcelik et al. | 348/608 |
| 5,768,440 | * | 6/1998 | Campanelli et al. | 382/261 |
| 5,771,318 | * | 6/1998 | Fang et al. | 382/261 |
| 5,812,702 | * | 9/1998 | Kundu | 382/260 |
| 5,832,134 | * | 11/1998 | Avinash et al. | 382/257 |
| 5,844,627 | * | 12/1998 | May et al. | 348/607 |
| 6,005,626 | * | 12/1999 | Ding | 348/416 |

* cited by examiner

Primary Examiner—Reinhard J. Eisenzopf
Assistant Examiner—Linus H. Lo
(74) Attorney, Agent, or Firm—Lee & Hayes, PLLC (57) ABSTRACT

Frames of a digital video signal are spatially filtered to remove impulse and other noise from the video signal. The spatially filtered frame is temporally filtered to further remove noise from the digital video signal. The spatial filter is adaptive, heavily filtering portions of low detail in the represented subject matter while lightly filtering or not filtering portions of moderate to high detail in the represented subject matter. As a result, clarity and detail in the subject matter of the digital video signal are preserved. The temporal filter is similarly adaptive and determines if and to what degree the subject matter of portions of the spatially filtered frame correlate with corresponding portions of a previous frame. By previously spatially filtering the frame, determinations regarding the correlation of the current frame with corresponding portions of the previous, which is also spatially and temporally filtered, are more accurate. Accordingly, temporal filtering can be performed more aggressively without temporally blurring the digital video signal. The result of spatial and temporal filtering of the digital video signal is significant reduction in noise without degradation of the signal and improved compression of the digital video signal.

13 Claims, 10 Drawing Sheets

SPATIAL AND TEMPORAL FILTERING MECHANISM FOR DIGITAL MOTION VIDEO SIGNALS

FIELD OF THE INVENTION

The present invention relates to digital video signal filtering and, in particular, to a particularly efficient signal filtering mechanism for pre-processing digital video signals prior to compression and encoding of the digital video signals for subsequent decoding and display.

BACKGROUND OF THE INVENTION

With the advent of digital video products and services, such as Digital Satellite Service (DSS) and storage and retrieval of video streams on the Internet and, in particular, the World Wide Web, digital video signals are becoming ever present and drawing more attention in the marketplace. Because of limitations in digital signal storage capacity and in network and broadcast bandwidth limitations, compression of digital video signals has become paramount to digital video storage and transmission. As a result, many standards for compression and encoding of digital video signals have been promulgated. For example, the International Telecommunication Union (ITU) has promulgated the H.261 and H.263 standards for digital video encoding. Additionally, the International Standards Organization (ISO) has promulgated the Motion Picture Experts Group (MPEG), MPEG-1, and MPEG-2 standards for digital video encoding.

These standards specify with particularity the form of encoded digital video signals and how such signals are to be decoded for presentation to a viewer. However, significant discretion is left as to how the digital video signals are to be transformed from a native, uncompressed format to the specified encoded format. As a result, many different digital video signal encoders currently exist and many approaches are used to encode digital video signals with varying degrees of compression achieved.

The primary objective of any digital video signal encoder is to achieve a high degree of compression without a significant loss of video signal. Video signal compression is generally achieved by representing identical or similar portions of an image as infrequently as possible to avoid redundancy. As a result, an image which has only very coarse detail and very few distinct colors can be compressed to a much smaller representation in comparison to a compressed representation of an image with significant amounts of very fine detail and many distinct colors. Unfortunately, video cameras and other video signal acquisition equipment introduce noise into the video signal and, from the perspective of video signal processing, the noise is generally indistinguishable from fine detail in the subject of the video signal. For example, ordinary noise in a monochromatic image may be indistinguishable from the fine detail and texture of a terrycloth towel photographed up close.

Digital video signal compression typically involves a transformation, e.g., a discrete cosine transformation (DCT), in which pixels which are relatively close in value to one another are represented in a particularly compact form. Noise in a digital video signal has a particularly adverse effect on such compression since the noise is frequently unrelated to the subject matter of the video image and frequently renders portions of the digital video signal inappropriate for representation in such a compact form.

To achieve both enhanced image quality and greater compression, video signal encoders frequently filter a video signal prior to encoding the video signal. However, the use of a particularly strong filter achieves greater compression at the expense of greater signal loss, and a particularly light filter preserves more of the original signal at the expense of a smaller degree of compression. Thus, digital video signals which include significant noise force a choice between image clarity and compression rate, i.e., the rate between the amount of data required to represent the digital video signal in uncompressed and compressed forms.

In addition, noise introduced by inexpensive, low-cost video capture and processing equipment is not adequately addressed by currently available digital video signal filters. Currently available digital video signal filters typically focus on Gaussian noise. However, ever growing popularity of inexpensive video recording and processing equipment, such as video cameras, video tape, and personal computer video capture cards, of moderate or questionable quality introduces noise which is not Gaussian.

What is needed is a digital video signal filter which can better eliminate the types of noise found in digital video signals without compromising the clarity and quality of the image of the digital video signal to thereby simultaneously improve the quality and compression rate of the digital video signal.

SUMMARY OF THE INVENTION

In accordance with the present invention, a digital video signal is spatially and temporally filtered to remove unwanted noise of the digital video signal such that better image quality of the digital video signal and reduced size when compressed and encoded are simultaneously achieved. The temporal filter determines whether a current block of pixels represents the same subject matter represented by a block of pixels of a previous frame and temporally filters the current block if the blocks represent the same subject matter. By spatially filtering the current block prior to making such a determination, impulse noise is significantly reduced and the accuracy with which such a determination is made is enhanced substantially. Accordingly, the temporal filter can more aggressively filter the digital video signal without risking temporal blurring of the digital video signal.

The spatial filter is adaptive in that a frame of the digital video signal is divided into blocks and each block is filtered according to the amount of subject matter detail represented in the block. Blocks are chosen small enough to allow smoothing up to but not including edges in the represented subject matter and large enough to provide effective smoothing. The amount of detail of the subject matter represented in each block is determined by measuring the variance of pixels values of the block. A large variance indicates significant detail in the subject matter of the block and causes the block to forego spatial filtering. A moderate variance indicates moderate detail and/or significant noise in the subject matter of the block and causes the block to be lightly spatially filtered. A low variance indicates little or no detail in the subject matter of the block and causes heavy spatial filtering of the block. Since small blocks are evaluated separately, background sections of an image can be filtered heavily to remove nearly all noise up to and very near edges at which detail in the subject matter of the image is not so heavily filtered and therefore preserved.

For blocks which are spatially filtered, a median filter effectively removes impulse noise from the digital video signal, and a smoothing filter further reduces any remaining noise. The median filter effectively removes the impulse noise without blurring or smudging the impulse noise thereby removing the impulse noise without any affects which are annoying or perceptible to a human viewer of a display of a decoded digital video signal. In addition, such effective removal of impulse noise substantially improves the performance of subsequent filtering steps such as smoothing and temporal filtering. After application of the median filter, lightly spatially filtered blocks are filtered with a light smoothing filter and heavily spatially filtered blocks are filtered with a heavy smoothing filter.

After spatial filtering, the spatially filtered frame is adaptively temporally filtered to further remove noise from the digital video signal. However, temporal filtering of the spatially filtered frame is bypassed altogether if the current frame and the previous frame are so different that common subject matter between the frames is unlikely to be found. When the spatially filtered frame is temporally filtered, the spatially filtered frame is divided into blocks. The blocks are sufficiently small to have a relatively good likelihood of matching corresponding blocks of a previous frame notwithstanding some changes and/or motion between the spatially filtered frame and the previous frame and are sufficiently large to relatively accurately determine whether corresponding blocks do, in fact, represent the same subject matter. Each block is compared to a corresponding block of the previous frame to determine if the subject matter represented by the block of the spatially filtered frame is the same as the subject matter represented by the corresponding block of the previous frame. The spatial filtering described above significantly improves the accuracy with which such a determination is made.

If the corresponding blocks do not represent the same subject matter, the block of the spatially filtered frame is not temporally filtered. Conversely, if the corresponding blocks do represent the same subject matter, each pixel of the spatially filtered block is compared a corresponding pixel of the block of the previous frame to determine how closely the corresponding pixels represent the same subject matter. A large difference indicates low correlation between the corresponding pixels, and thus low confidence that the corresponding pixels represent the same subject matter, and causes the pixel of the spatially filtered block to forego temporal filtering. A moderate difference indicates moderate correlation between the pixels and/or significant noise between the corresponding pixels and causes the pixel of the spatially filtered block to be lightly temporally filtered. A low difference indicates high correlation between the corresponding pixels, and therefore high confidence that the corresponding pixels represent the same subject matter, and causes heavy temporal filtering of the pixel of the spatially filtered block. Since each pixel is evaluated separately and is filtered temporally, the image is not blurred spatially by the temporal filter. In addition, the multi-tiered approach to determining the similarity of the subject matter of the current frame and the previous frame with the accuracy of such a determination enhanced by the spatial filtering of the current frame and of the previous frame, having been previously spatially and temporally filtered, further preserves the temporal clarity and detail of the motion video image.

The result of filtering frames of a motion video image in accordance with the present invention is that the particular types of noise prevalent in motion video images, e.g., impulse noise, is effectively removed from the motion video image without the spatial and temporal blurring and general sacrifice of image detail of conventional filtering mechanisms. Digital video signals are usually improved considerably such that artifacts introduced by recording and processing the digital video signal are removed and clarity appears restored. The enhanced clarity is particularly noticeable in digital video signals representing stationary text. In addition, artifacts which are sometimes introduced into digital video signals during compression and encoding are mitigated since the digital video signal is largely free from unwanted noise. The filtering mechanism according to the present invention is also particularly robust in that virtually no type of digital video signal is worsened by application of the filtering mechanism according to the present invention. Conversely, most conventional filtering mechanisms improve some types of digital video signals and worsen other types of digital video signals. In addition, the lack of unwanted noise substantially reduces the amount of data required to represent the digital video signal in a compressed form without sacrificing the image quality of the digital video signal.

DETAILED DESCRIPTION

In accordance with the present invention, a video signal encoder 100 (FIG. 1) pre-filters a digital video signal prior to encoding the digital video signal to thereby remove unwanted noise and simultaneously improve the image quality and reduce the size of the digital video signal as encoded. Video signal encoder 100 includes a pre-filter 130 which, as described more completely below, includes a spatial filter 202 (FIG. 2) and a temporal filter 204. Both spatial filter 202 and temporal filter 204 adaptively filter out noise, of various types typically introduced into digital video signals, according to the subject matter of the digital video signal. The result is improved image quality of the digital video signal as encoded, often better than the image quality of the motion video image prior to encoding, and significantly improved compression rates at the same time. In other words, the distortion-rate performance of the encoding of the digital video signal is significantly enhanced.

Figure 1:
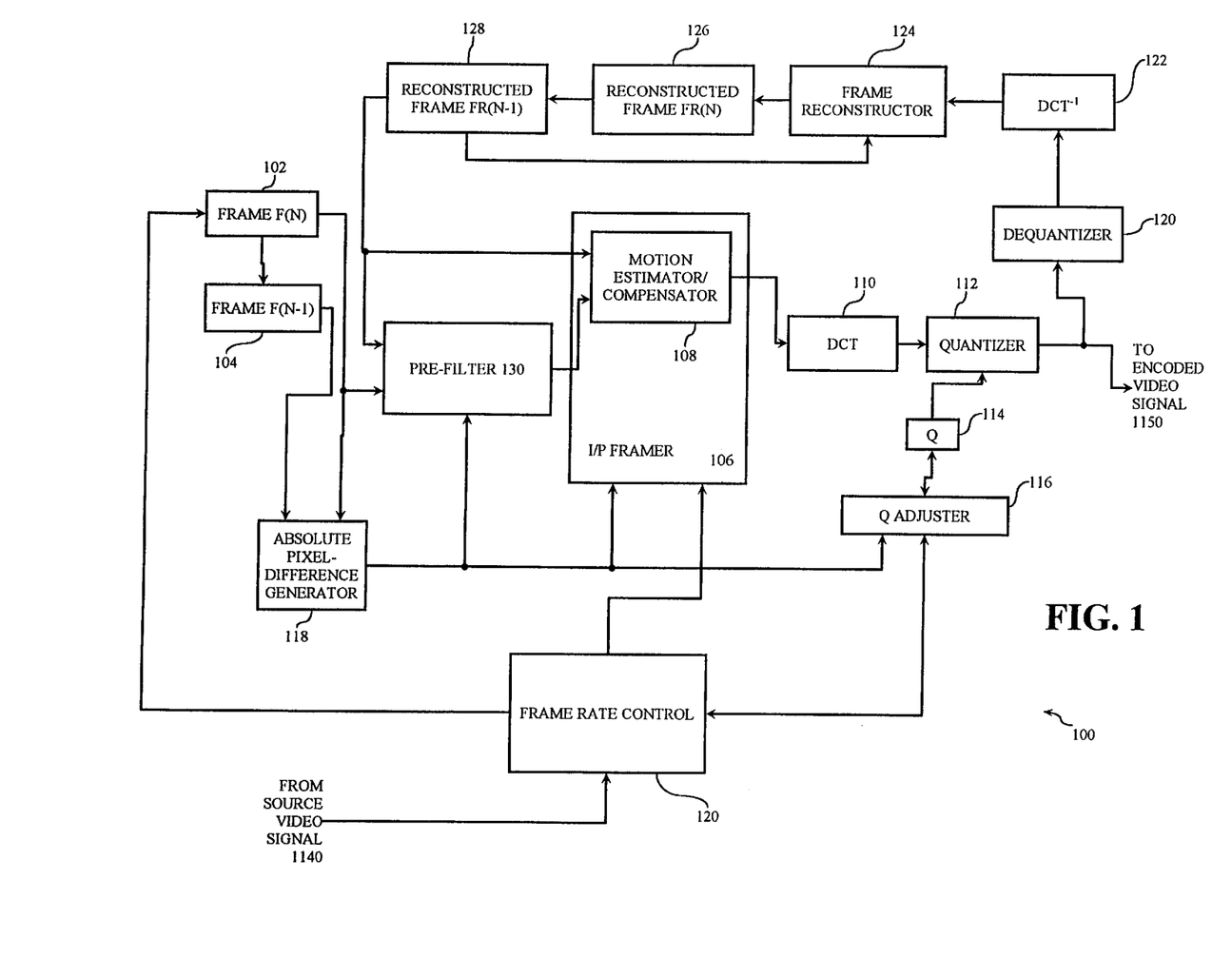
FIG. 1 is a block diagram of a video signal encoder which includes a digital video signal pre-filter in accordance with the present invention.

Appreciation of the present invention is enhanced by understanding of the various components and operation of video signal encoder 100 (FIG. 1). Video signal encoder 100 receives a frame of a video signal from a video source (not shown in FIG. 1) which can include, for example, a video camera, a video cassette player, a video laser disk player, or similar video source. Video signal encoder 100 stores the frame in buffer 102 after moving any frame previously stored in buffer 102 into buffer 104. Thus, video signal encoder 100 stores two consecutive frames in buffers 102 and 104. The frame stored in buffer 102 is sometimes referred to herein as the current frame, and the frame stored in buffer 104 is sometimes referred to herein as the previous frame.

The current frame is filtered in pre-filter 130 in the manner described more completely below to produce a current filtered frame. I/P framer 106 of video signal encoder 100 includes a motion estimator/compensator 108 which retrieves the current filtered frame from pre-filter 130 and a reconstructed previous frame from a buffer 128 and derives motion vectors which represent motion between the current filtered frame and reconstructed previous frame. The reconstructed previous frame is reconstructed from a previously encoded frame as described more completely below. For each of one or more macroblocks of the current frame, motion estimator 106 derives a motion vector which specifies a portion of the reconstructed previous frame which the macroblock corresponds and an associated motion vector error signal.

Motion estimator/compensator 108 produces a current motion-compensated frame from the motion vectors and the current filtered frame received from pre-filter 130 and the reconstructed previous frame received from buffer 128. Motion estimator/compensator 108 passes the motion-compensated frame to transform coder 110 which performs direct cosine transformation (DCT) on the motion-compensated macroblocks of the motion-compensated frame to produce a transformed frame. Transform coder 110 passes the transformed frame to a quantizer 112. Quantizer 112 quantizes coefficients used in transform coder 110 and these coefficients are then used later for Huffman coding the transformed frame to complete compression of the current frame retrieved from buffer 102. Huffman coding is described more completely in copending U.S. patent application Ser. No. 08/818,805 for "Method and Apparatus for Implementing Motion Detection and Estimation in Video Compression" filed on Mar. 14, 1997, and that description is incorporated herein by reference.

As described briefly above, a reconstructed previous frame is used to estimate motion between consecutive frames. The reconstructed previous frame is also used to filter the current frame in pre-filter 130 in a manner described more completely below. The reconstructed previous frame is formed as follows. A dequantizer 120 receives the encoded current frame from quantizer 112 and performs the inverse of the quantization performed by quantizer 112. The dequantized frame is transferred from dequantizer 120 to a transform decoder 122 which performs an inverse direct cosine transformation of the DCT performed by transform coder 110. A frame reconstructor 124 receives the transformed frame and reconstructs a reconstructed current frame therefrom. Specifically, frame reconstructor 124 reconstructs motion-compensated macroblocks of the frame received from transform decoder 122 by reference to a previously reconstructed frame stored in buffer 128. The reconstructed current frame is stored in a buffer 126 and the reconstructed frame which is previously stored in buffer 126 is moved to buffer 128. Therefore buffer 128 stores a reconstructed previous frame which is reconstructed from the previously encoded frame. Dequantizer 120, transform decoder 122, and frame reconstructor 124 are conventional.

The quantization performed by quantizer 112 is controlled by quantization parameter Q 114 which is in turn controlled by Q adjuster 116 in a manner described more completely in U.S. patent application Ser. No. 08/819,507 for "Digital Video Signal Encoder and Encoding Method" by Albert S. Wang and that description is incorporated herein by reference.

Some frames are encoded independently of other frames of the digital video signal while other frames are encoded are motion-compensated and are therefore encoded in a form which is dependent upon other frames of the digital video signal. In encoding frames of the digital video signal, all frames are compressed by reducing redundancy of image data within a single frame, and motion-compensated frames are further compressed by reducing redundancy of image data within a sequence of frames. Since a digital video signal includes a sequence of images which differ from one another only incrementally, significant compression can be realized by encoding a number of frames as motion-compensated frames. However, noise in sequential images of a video signal can be misinterpreted as additional differences between the images and can therefore reduce the efficiency with which motion-compensated frames can represent the sequential images.

Pre-Filter 130

Since noise in a digital video signal is generally misinterpreted as detail in the subject matter of the digital video signal, removal of noise from the digital video signal by pre-filter 130 prior to encoding the digital video signal improves the distortion-rate performance of such encoding. Pre-filter 130 is shown in greater detail in FIG. 2.

Figure 2:
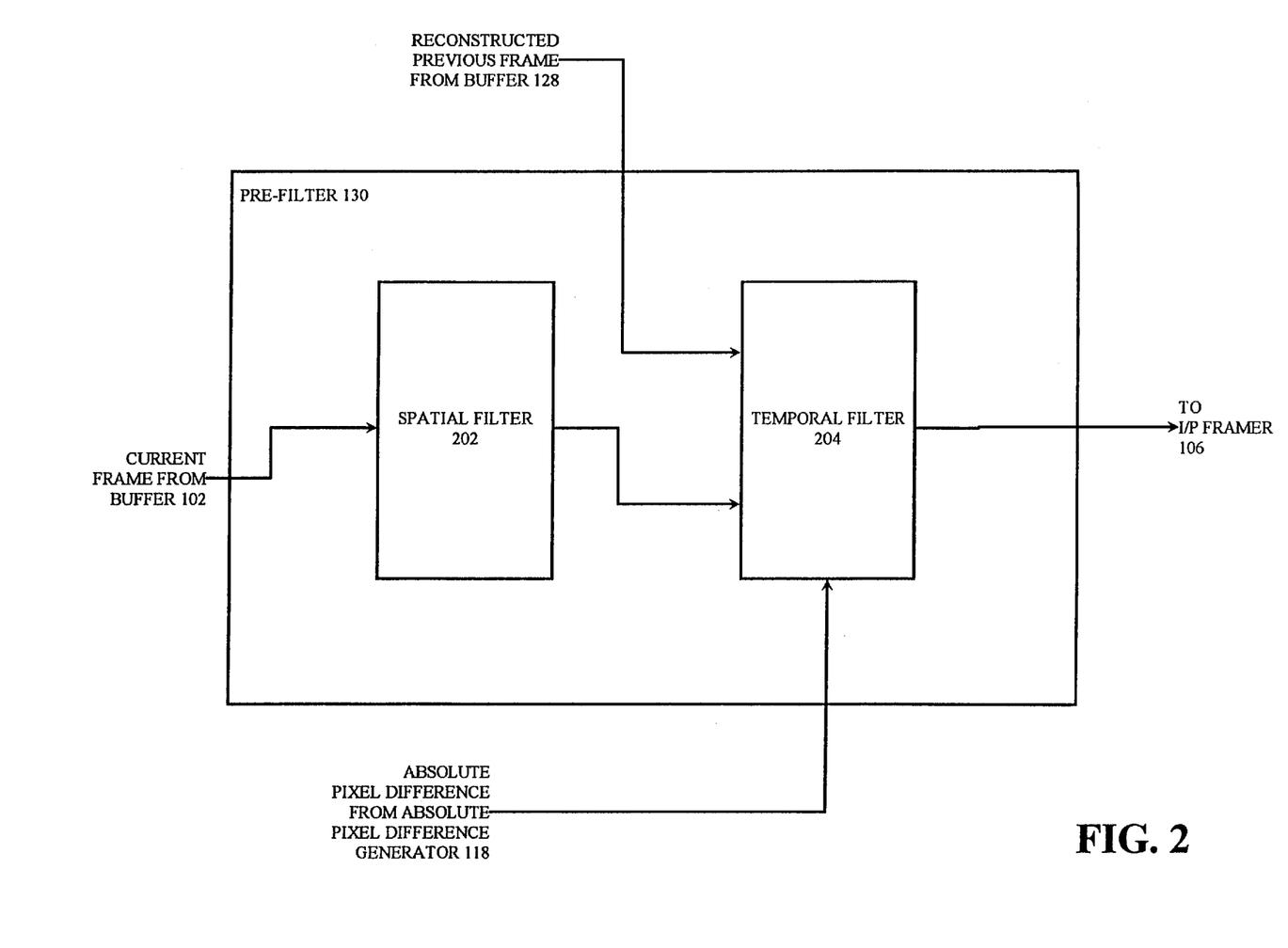
FIG. 2 is a block diagram showing the digital video signal pre-filter of FIG. 1 in greater detail, including a spatial filter and a temporal filter.

Pre-filter 130 includes a spatial filter 202 and a temporal filter 204. Spatial filter 202 filters pixels of the current frame, received from buffer 102, using only other pixels of the current frame. Temporal filter 204 receives the current frame from spatial filter 202 after such spatial filtering. Temporal filter 204 is adaptive and first determines in a manner described more completely below whether corresponding portions of the filtered current frame and the reconstructed previous frame, received from buffer 128, represent the same subject matter prior to temporally filtering the spatially filtered current frame. Prior spatial filtering of the frame substantially improves the accuracy with which temporal filter 204 makes such a determination.

Spatial Filter 202

Figure 3:
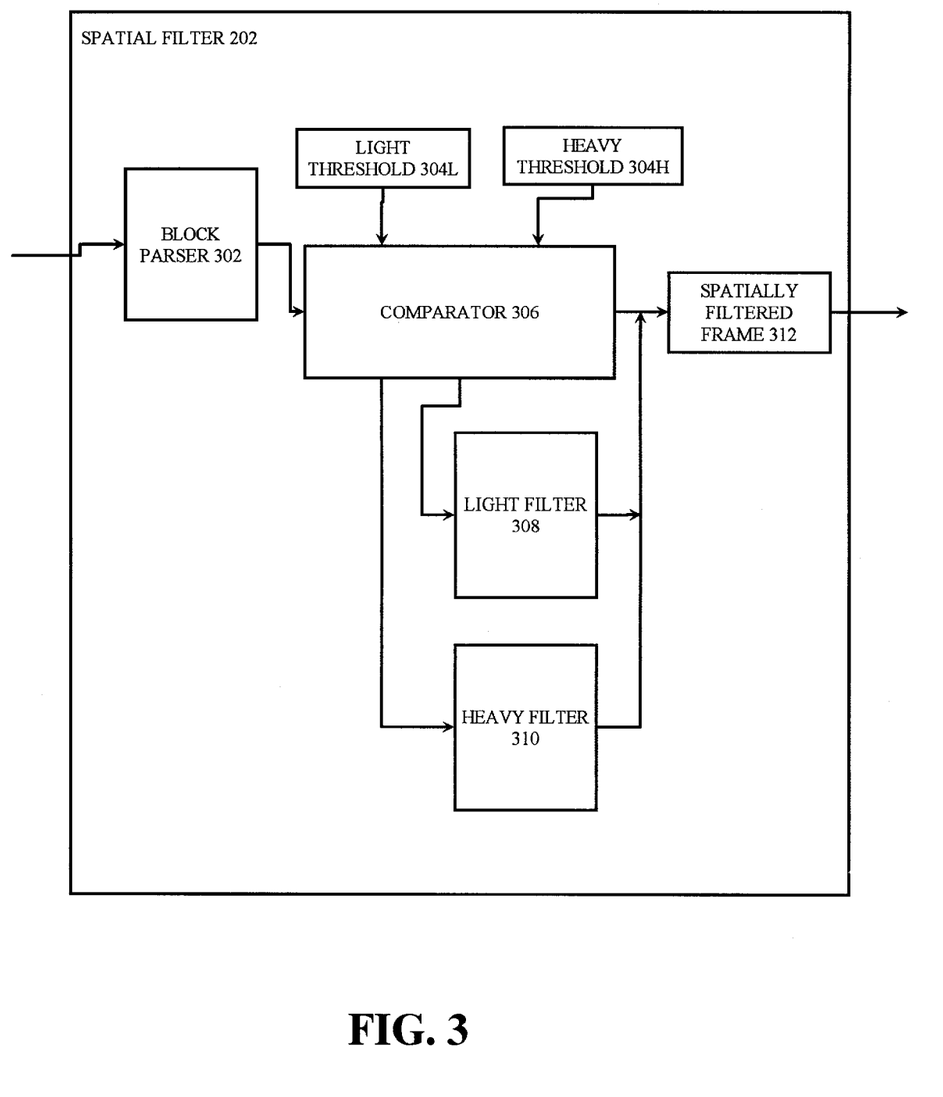
FIG. 3 is a block diagram of the spatial filter of FIG. 2 in greater detail.
Figure 4:
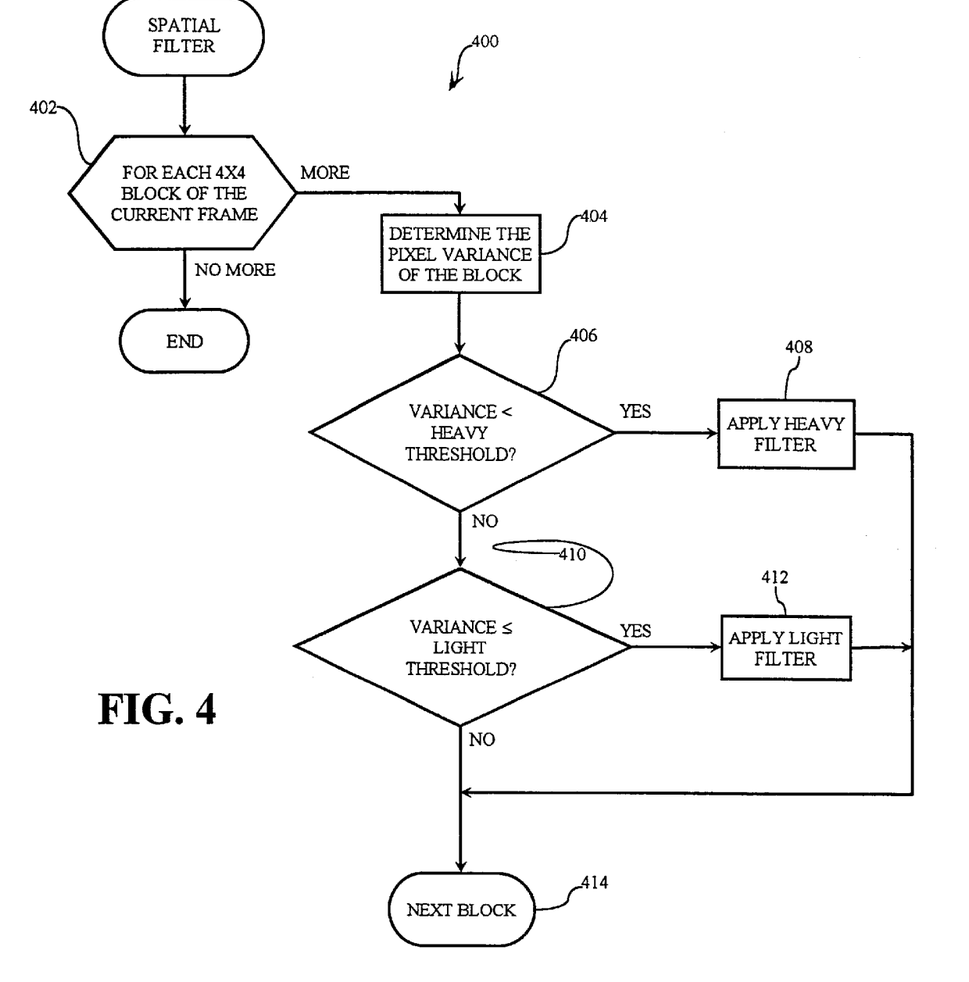
FIG. 4 is a logic flow diagram of the processing of the spatial filter of FIG. 3.

Spatial filter 202 is shown in greater detail in FIG. 3. The processing of spatial filter 202 is shown in logic flow diagram 400 (FIG. 4). Spatial filter 202 (FIG. 3) is adaptive in that spatial filter 202 filters respective portions of the current frame differently according to the subject matter content of each portion. Accordingly, portions of the current frame which include very little detail, e.g., monochromatic backgrounds, are filtered heavily, (ii) portions of the current frame with moderate detail are filtered lightly, and (iii) portions with significant detail are not filtered at all.

Spatial filter 202 filters each component of the pixels of the current frame independently of other components. Briefly, color pixels can be represented using multiple components. For example, RGB pixels are represented by red, green, and blue components. Similarly, YUV pixels are represented by a luminance component (Y) and two chrominance components (U and V). The following example illustrates the advantage of filtering each component separately. Suppose the subject matter of the current frame includes a coarsely knit, monochromatic sweater. In YUV format, the sweater is represented with significant detail in the luminance component (the fine detail of the coarsely knit sweater) and significantly less detail in the chrominance components (since the sweater is monochromatic). Spatially filtering each component of the current frame independently allows a heavy filter to be applied to the chrominance components to effectively remove most, if not all, of the visible noise from the chrominance components while a light filter or no filter is applied to the luminance component to preserve the detail of the luminance of the subject matter, e.g., of the coarse knit of the sweater.

Spatial filter 202 includes a block parser 302 which parses the current frame into blocks of pixels as represented in the loop defined by steps 402 (FIG. 4) and 414. In one embodiment, the blocks of pixels includes four rows and four columns of pixels. The block size is chosen to be small enough to allow effective adaptation of spatial filter 202 (FIG. 3) yet large enough to provide effective filtering. Frames often include areas of significantly detailed subject matter adjacent to areas with little or no detail in the subject matter. Smaller block sizes permits heavy filtering of low-detail areas very close to high-detail areas without unduly blurring high-detail areas near low-detail areas. However, block sizes which are excessively small provide insufficient numbers of pixels for effective spatial filtering. Four-pixel by four-pixel blocks provide particularly good results in one embodiment. In the loop defined by steps 402 (FIG. 4) and 414, each 4-by-4 block of pixels is processed according to steps 404–412 by spatial filter 202 (FIG. 3). During each iteration of the loop, the particular block of pixels processed is sometimes referred to as the subject block.

Spatial filter 202 includes a comparator 306 determines the degree of detail in the subject matter of the subject block. Specifically, comparator 306 determines the variance, i.e., the squared error about the mean, of the values of a particular component of the pixels of the subject block in step 404 (FIG. 4). In test steps 406 and 410, comparator 306 compares the variance determined in step 404 (FIG. 4) to a predetermined heavy threshold 304H (FIG. 3) and to a predetermined light threshold 304L, respectively. Heavy threshold 304H represents a pixel block variance threshold for low detail pixel blocks and indicates a variance threshold for heavy filtering. Light threshold 304L represents a pixel block variance threshold for medium detail pixel blocks and indicates a variance threshold for light filtering. In one embodiment, heavy threshold 304H has a value of twenty-five and light threshold 304L has a value of one hundred.

Comparator 306 compares heavy threshold 304H to the variance of the subject block in test step 406. If the variance of the subject block is less than heavy threshold 304H, processing transfers to step 408 (FIG. 4) in which a heavy filter 310 filters the subject block to form a heavily filtered block which is stored as part of a spatially filtered frame 312. Step 408 (FIG. 4) is described below in greater detail.

Conversely, if the variance of the subject block is not less than heavy threshold 304H (FIG. 3), processing transfers from test step 406 (FIG. 4) to test step 410. In test step 410, comparator 306 (FIG. 3) compares the variance of the subject block to light threshold 304L. If the variance of the subject block is not greater than light threshold 304L, processing transfers to step 412 (FIG. 4) in which a light filter 308 filters the subject block to form a lightly filtered block which is stored as part of spatially filtered frame 312. Step 412 (FIG. 4) is described below in greater detail.

Conversely, if the variance of the subject block is greater than light threshold 304L, no spatial filter is applied to the subject block and the subject block is stored as part of spatially filtered frame 312. Processing transfers from steps 408 and 412, and from test step 410 if the variance of the subject block is greater than light threshold 304L, to next step 414 in which the next block of the current frame is processed by comparator 306 (FIG. 3) according to steps 404–412 (FIG. 4). When all blocks of the current frame have been processed according to the loop of steps 402 and 414, processing according to logic flow diagram 400 completes and spatially filtered frame 312 (FIG. 3) represents the subject matter of the current frame after adaptive spatial filtering in the manner described above.

Figure 5:
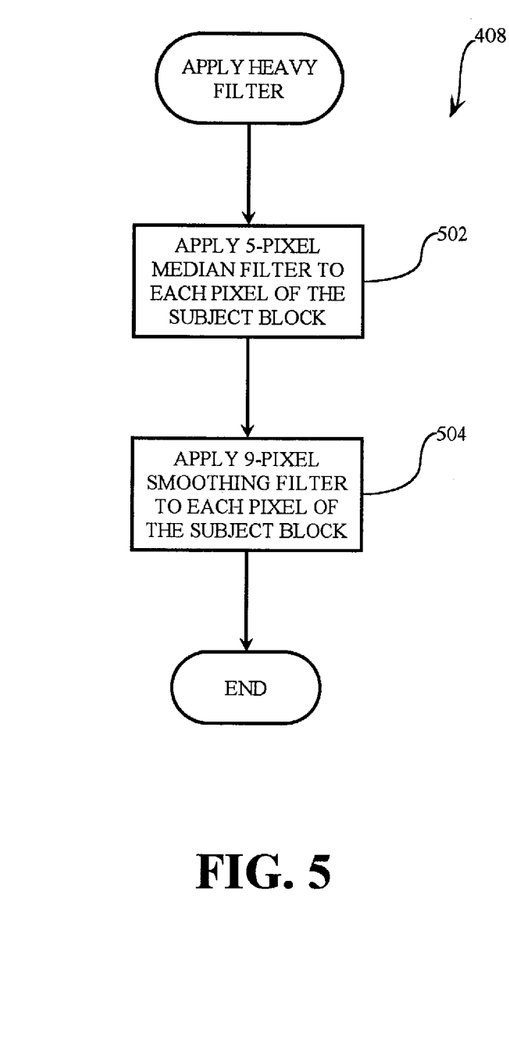
FIG. 5 is a logic flow diagram of a heavy filtering step of the logic flow diagram of FIG. 4 in greater detail.

The heavy filtering of step 408 (FIG. 4) and heavy filter 310 (FIG. 3) is shown in greater detail as logic flow diagram 408 (FIG. 5). In step 502, heavy filter 310 (FIG. 3) applies a 5-pixel median filter to each pixel of the subject block. For a particular pixel 702 (FIG. 7A) of the subject block, heavy filter 310 (FIG. 3) determines the values of pixel 702 (FIG. 7A) and adjacent pixels 702N, 702S, 702E, and 702W to the north, south, east, and west, respectively, of pixel 702 and selects the median value as the new value of pixel 702. The median filter applied in step 502 (FIG. 5) is particularly effective in removing impulse noise which is typically introduced by electrical equipment used in capturing and processing digital video signals, e.g., video cameras, video tape, video tape players/recorders, and computer video capture circuitry. One of the deficiencies of conventional digital video signal filtering mechanisms is that such conventional system typically assume and address only Gaussian noise which is more randomly and evenly distributed than impulse noise. A median filter such as that described above is not particularly effective at removing Gaussian noise but is particularly effective at removing impulse noise.

Figure 7A:
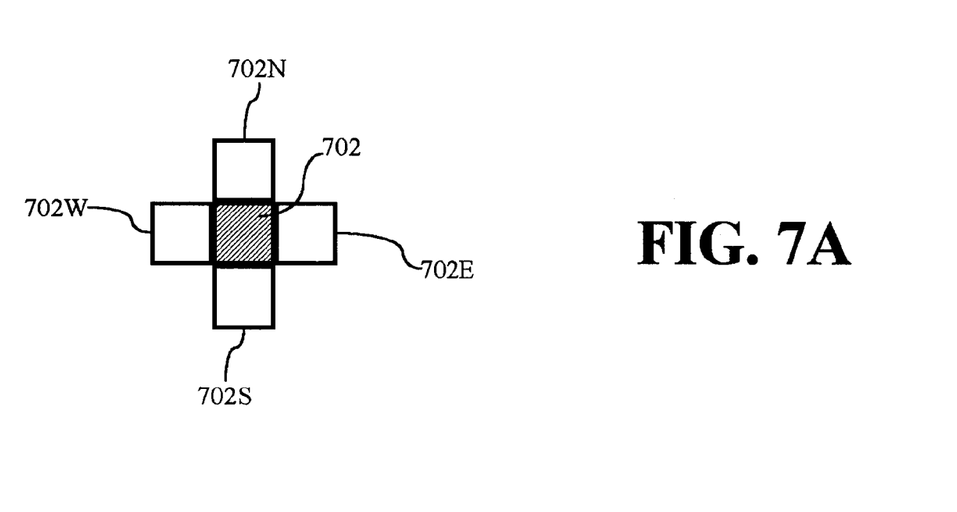
FIGS. 7A and 7B are block diagrams illustrating the relative positions of pixels used by the spatial filter of FIG. 3.

Along the edges and corners of the subject block, one or two of the adjacent pixels shown in FIG. 7A are not available. For example, if pixel 702 is in a corner of the subject block, two adjacent pixels are unavailable. Accordingly, the new value of pixel 702 is the median of three pixel values, namely, the value of pixel 702 and the two remaining adjacent pixels. If pixel 702 is along one edge of the subject block, only four pixel values are available, namely, pixel 702 and three remaining adjacent pixels. Accordingly, the value of pixel 702 is replicated to provide a fifth pixel value, and the median of the five pixel values is selected as the new value of pixel 702.

Figure 7B:
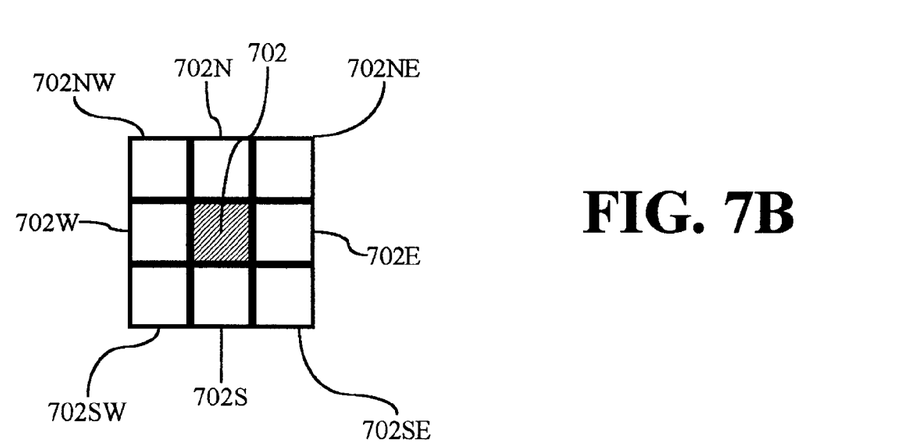

After application of the media filter in step 502 (FIG. 5), heavy filter 310 (FIG. 3) applies a 9-pixel smoothing filter to each pixel of the median-filtered subject block in step 504 (FIG. 5). In filtering pixel 702 (FIG. 7B), the mean of the values of pixel 702 and of all adjacent pixels including pixels 702N, 702S, 702E, 702W, 702NW, 702NE, 702SE, and 702SW is selected as the new value of pixel 702. When one or more adjacent pixels are unavailable due to the location of pixel 702 along an edge or in a corner of the subject block, the new value of pixel 702 is the mean of the value of pixel 702 and of all available adjacent pixels. The smoothing of step 504 (FIG. 5) helps remove any noise not already removed by the median filtering of step 502. Since any impulse noise is effectively removed by the median filtering of step 502, none of the annoying and perceptible artifacts resulting from smoothing of impulse noise are present. The performance and robustness of the smoothing filtering of step 504 are therefore significantly improved. After step 504, processing according to logic flow diagram 408, and therefore step 408 (FIG. 4), completes.

Figure 6:
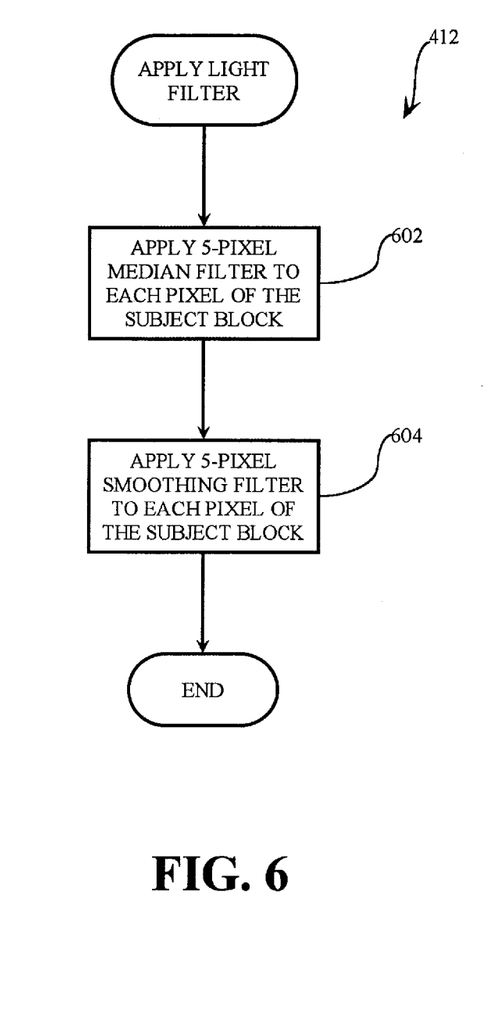
FIG. 6 is a logic flow diagram of a light filtering step of the logic flow diagram of FIG. 4 in greater detail.

The light filtering of step 412 (FIG. 4) and light filter 308 (FIG. 3) is shown in greater detail as logic flow diagram 412 (FIG. 6). In step 602, light filter 308 (FIG. 3) applies a 5-pixel median filter to each pixel of the subject block in a manner which is directly analogous to the median filter described above with respect to step 502 (FIG. 5).

After application of the media filter in step 602 (FIG. 6), light filter 310 (FIG. 3) applies a 5-pixel smoothing filter to each pixel of the median-filtered subject block in step 604 (FIG. 6). In filtering pixel 702 (FIG. 7A), the mean of the values of pixel 702 and of adjacent pixels including pixels 702N, 702S, 702E, and 702W is selected as the new value of pixel 702. When one or more adjacent pixels are unavailable due to the location of pixel 702 along an edge or in a corner of the subject block, the new value of pixel 702 is the mean of the value of pixel 702 and of all available adjacent pixels. The smoothing of step 604 (FIG. 6) helps remove any noise not already removed by the median filtering of step 602 yet is lighter than the smoothing of step 504 (FIG. 5) by heavy filter 310 (FIG. 3) to thereby preserve more of the detail of the subject matter of the subject block. The median filtering of step 602 (FIG. 6) improves the performance and robustness of the smoothing filtering of step 604 in an analogous manner to that described above with respect to steps 502 (FIG. 5) and 504. After step 604 (FIG. 6), processing according to logic flow diagram 412, and therefore step 412 (FIG. 4), completes.

Thus, spatial filter 202 (FIG. 3) adaptively applies heavy spatial filtering to portions of the current frame which represent subject matter of relatively little or no detail, light spatial filtering to portions of the current frame which represent subject matter of moderate detail, and no spatial filtering to portions of the current frame which represent subject matter of relatively high detail. In addition, the particular types of spatial filtering applied by spatial filter 202 are specifically designed to remove impulse noise which is typically prevalent in digital video signals while conventional systems typically focus exclusively on Gaussian noise and largely ignore non-Gaussian noise which is also frequently present in digital video signals. The current frame, after adaptive spatial filtering, is stored as spatially filtered frame 312.

Temporal Filter 204

Figure 8:
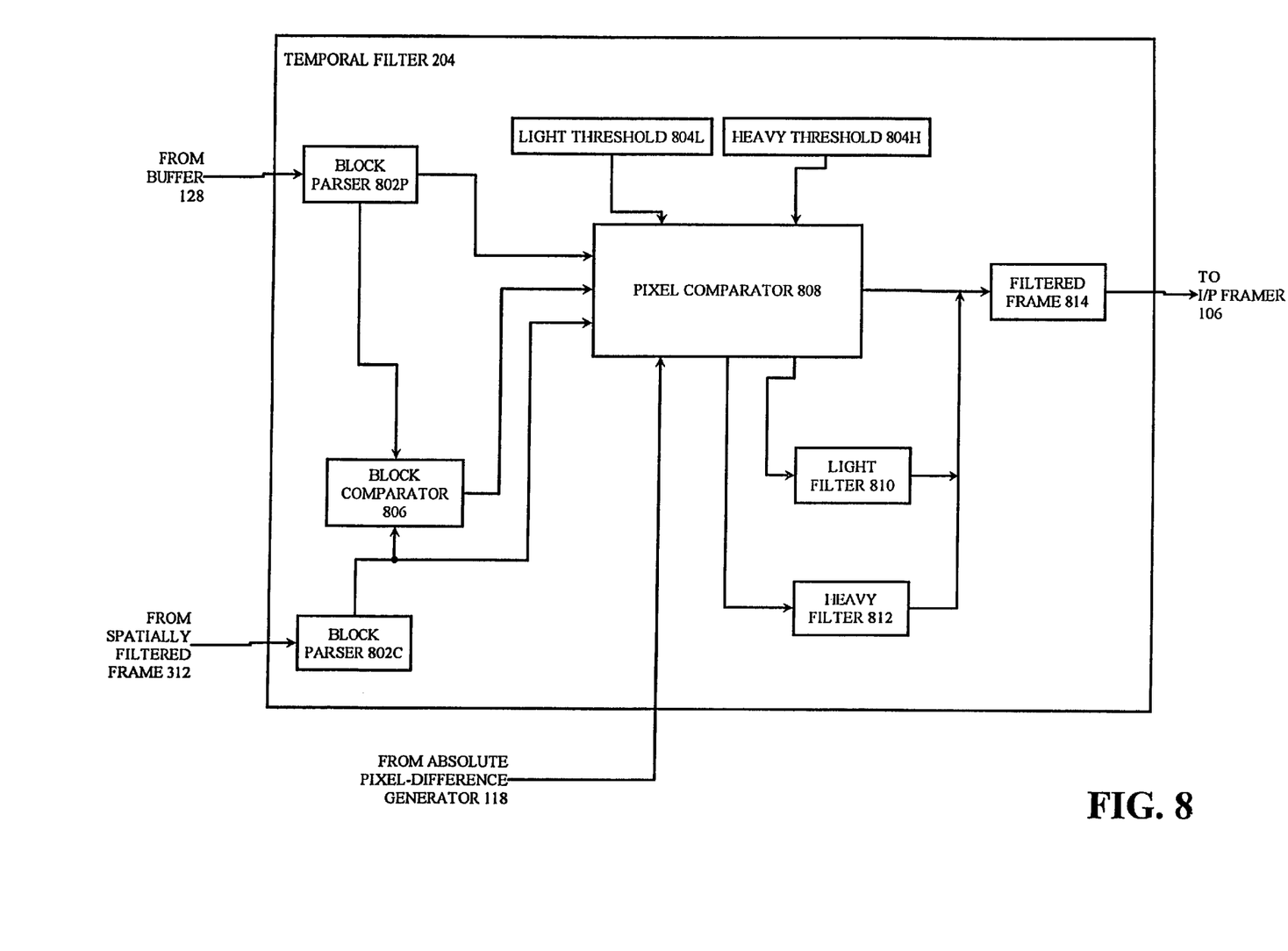
FIG. 8 is a block diagram of the temporal filter of FIG. 2 in greater detail.
Figure 9:
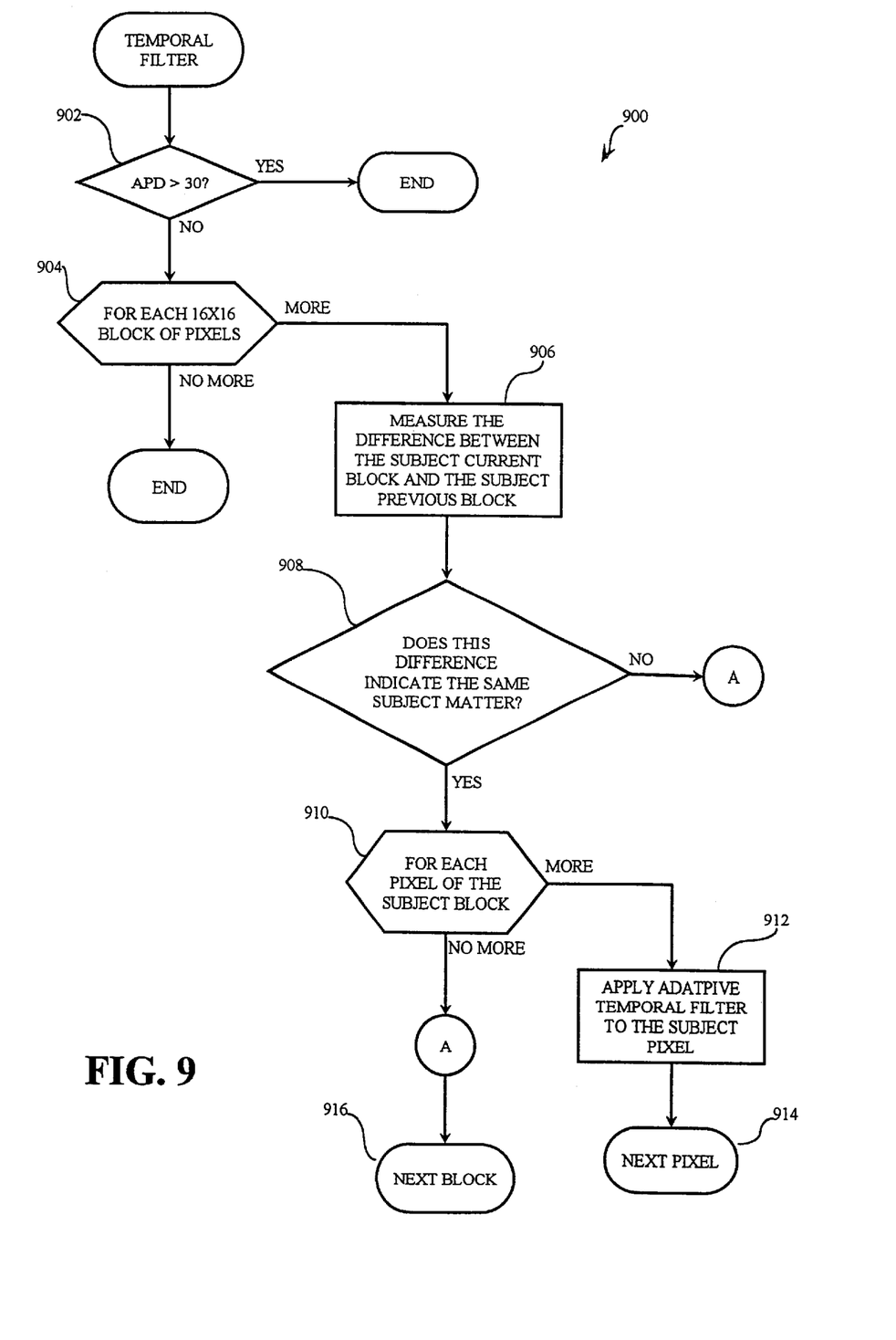
FIG. 9 is a block diagram of the processing of the temporal filter of FIG. 8.

Temporal filter 204 (FIG. 2) receives spatially filtered frame 312 (FIG. 3) from spatial filter 202 and a reconstructed previous frame from buffer 128 (FIG. 1) and adaptively temporally filters spatially filtered frame 312 (FIG. 3) using the reconstructed previous frame. Temporal filter 204 is shown in greater detail in FIG. 8. Processing by temporal filter 204 is illustrated by logic flow diagram 900 (FIG. 9).

Prior to temporally filtering any portion of spatially filtered frame 312, temporal filter 204 (FIG. 8) determines whether the differences between the current frame and the previous frame are so great that temporal filtering is futile, i.e., is likely to produce no appreciable improvements in image quality. To make such a determination, temporal filter 204 receives a measure of the differences between the current frame and the previous frame from absolute pixel-difference generator 118 and compares the measure to a predetermined threshold. Absolute pixel-difference generator 118 (FIG. 1) produces such a measurement in the form of an absolute pixel difference between the current and previous frames.

An absolute pixel difference between two frames is the average of the absolute value of the difference of each pair of corresponding pixels of the two frames. Absolute pixel difference generator 118 retrieves the current and previous frames from buffers 102 and 104, respectively, and determines the absolute value of the difference between corresponding pixels of the current and previous frames. From these determined absolute differences, absolute pixel difference generator 118 determines the average absolute difference per pixel between the two frames. The absolute pixel difference is a good indicator of overall differences between two frames. In contrast, root-mean-square differences between corresponding pixels of two frames exaggerates large differences between only a few pixels of the frames.

Temporal filter 204 (FIG. 8) compares the received absolute pixel difference to a predetermined threshold in test step 902 (FIG. 9) and bypasses all temporal filtering of spatially filtered frame 312 (FIG. 3), thereby producing spatially filtered frame 312 as filtered frame 814, if the received absolute pixel difference is greater than the predetermined threshold. In one embodiment, the predetermined threshold represents a absolute pixel difference of thirty (30). Conversely, if the received absolute pixel difference is not greater than the predetermined threshold, processing by temporal filter 204 (FIG. 8) transfers to loop step 904 which, in conjunction with next step 916, defines a loop in which each of a number of blocks of spatially filtered frame 312 is processed according to steps 906–914. For each of the blocks of spatially filtered frame 312, processing transfers from loop step 904 to step 906. During each iteration of the loop of steps 904 and 916, the particular blocks of spatially filtered frame 312 and the reconstructed previous frame processed according to steps 906–914 are sometimes referred to herein as the subject current block and the subject previous block, respectively. When all blocks of spatially filtered frame 312 are processed, processing according to logic flow diagram 900 completes.

Temporal filter 204 (FIG. 8) includes a block parser 802C which parses spatially filtered frame 312 into blocks of a particular size, e.g., 16 rows and 16 columns of pixels, and a block parser 802P which parses the reconstructed previous frame into corresponding, equal-sized blocks. In one embodiment, the positions of corresponding blocks of the reconstructed previous frame are directly analogous to the corresponding positions of corresponding blocks of spatially filtered frame 312. In an alternative embodiment, the positions of corresponding blocks of the reconstructed previous frame are motion compensated relative to the positions of corresponding blocks of spatially filtered frame 312.

The illustrative block size described above, i.e., 16-by-16 pixels, is selected to effectively detect identical subject matter between the reconstructed previous frame and spatially filtered frame 312. If the block size is too large, blocks which include both identical subject matter and changed subject matter are determined to include changed subject matter and the advantages of temporally filtering are not realized. Conversely, if the block size is too small, each block can frequently contain insufficient pixel data to accurately determine whether a corresponding block of pixel data represents the same subject matter.

In step 906 (FIG. 9), a block comparator 806 (FIG. 8) of temporal filter 204 measures a difference between the subject current block and the subject previous block to determine whether the subject current block and the subject previous block represent the same subject matter. In one embodiment, block comparator 806 measures the difference by computing a composite mean squared error of corresponding pixels of the subject current and previous blocks. The composite mean squared error is the average mean squared error of the various components of the pixels of the subject current and previous blocks. For example, if the pixels of the subject current and previous blocks have three components in the YUV format, the composite mean squared error is one third of the sum of (i) the mean squared error of the Y luminance components of corresponding pixels of the subject current and previous blocks, (ii) the mean squared error of the U chrominance components of corresponding pixels of the subject current and previous blocks, and (iii) the mean squared error of the V chrominance components of corresponding pixels of the subject current and previous blocks. The composite mean squared error provides a good indication as to whether the subject current and previous blocks represent the same subject matter since dissimilar subject matter can differ significantly in only one of the components of the pixels of the respective blocks.

In test step 908 (FIG. 9), a pixel comparator 808 (FIG. 8) of temporal filter 204 receives the measured difference between the subject current and previous blocks from block comparator 806 and determines whether the measured difference indicates that the subject current and previous blocks represent the same subject matter. In one embodiment, pixel comparator 808 makes such a determination by comparing the measured difference to a predetermined threshold, e.g., twenty-five (25), such that a measured difference greater than the predetermined threshold indicates that the subject current and previous frames do not represent the same subject matter. If, in test step 908 (FIG. 9), pixel comparator 808 (FIG. 8) determines that the subject current and previous blocks represent different subject matter, processing transfers through next step 916 (FIG. 9) to loop step 904 in which the next block of spatially filtered frame 312 and the corresponding block of the reconstructed previous frame in a subsequent iteration of the loop of steps 904 and 916. Accordingly, steps 910–914, which are described below, are bypassed and no temporal filtering is applied to the subject current block. The subject current block is therefore included in filtered frame 814 (FIG. 8).

Conversely, if pixel comparator 808 determines that the subject current and previous blocks represent the same subject matter, processing transfers from test step 908 (FIG. 9) to loop step 910 and an adaptive temporal filter is applied to the subject current block. Loop step 910 and next step 914 define a loop within which each pixel of the subject current block and the corresponding pixel of the subject previous block are processed according to step 912. During a particular iteration of the loop of steps 910 and 914, the pixel of the subject current block processed by pixel comparator 808 (FIG. 8) is sometimes referred to as the subject current pixel, and the corresponding pixel of the subject previous block is sometimes referred to as the subject previous pixel. In step 912 (FIG. 9), pixel comparator 808 (FIG. 8) adaptively and temporally filters the subject current pixel in a manner illustrated by logic flow diagram 912 (FIG. 10) which shows test 912 (FIG. 9) in greater detail. In step 912, pixel comparator 808 (FIG. 8) filters each component of each pixel of the subject current block independently since pixel comparator 808 has already determined in test step 908 (FIG. 9).

In step 1002 (FIG. 10), pixel comparator 808 (FIG. 8) determines the pixel error between the subject current pixel and the subject previous pixel. Pixel comparator 808 measures the pixel error between corresponding pixels of the subject current and previous blocks as the absolute difference between corresponding components of the corresponding pixels. The pixel error indicates whether the subject current pixel is to be heavily, lightly, or not temporally filtered by pixel comparator 808. Such provides particularly good results in terms of video image clarity since blocks of successive frame which represent the same subject matter can include slight differences in subject matter due to movement of the represented subject matter between frames. By determining the error of each pixel and adapting the filter accordingly prevents temporal blurring and still effectively removes noise from the digital video signal.

In test step 1004 (FIG. 10), pixel comparator 808 (FIG. 8) compares the pixel error to a predetermined heavy threshold 804H which has a value of five (5) in one embodiment. If the pixel error is not greater than heavy threshold 804H, processing transfers to step 1006 (FIG. 10) in which the subject current pixel is heavily temporally filtered using heavy filter 812. In one embodiment, heavy filter 812 is a two-tap infinite impulse response (IIR) filter in which the subject previous pixel is weighted by a factor of 0.75 and the subject current pixel is weighted by a factor of 0.25 and the weighted pixels are summed to form a heavily filtered pixel which is stored in filtered frame 814 in place of the subject current pixel.

Figure 10:
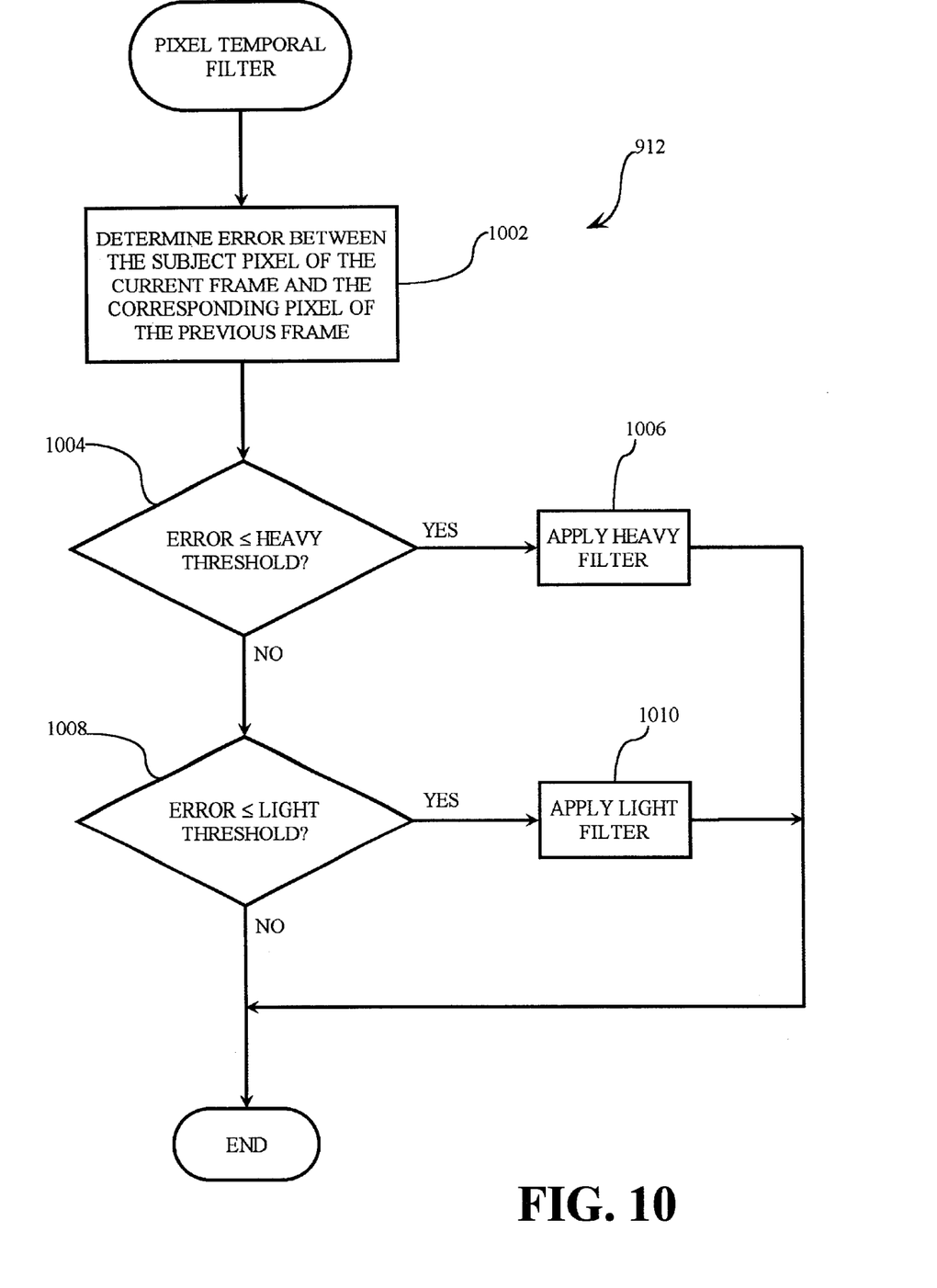
FIG. 10 is a block diagram of a step of the logic flow diagram of FIG. 9 in greater detail.

If the pixel error is greater than heavy threshold 804H, processing transfers from test step 1004 FIG. 10) to test step 1008. In test step 1008, pixel comparator 808 FIG. 8) compares the pixel difference to a predetermined light threshold 804L which has a value often (10) in one embodiment. If the pixel error is not greater than light threshold 804L, processing transfers to step 1010 (FIG. 10) in which the subject current pixel is lightly temporally filtered using light filter 810. In one embodiment, light filter 810 is a two-tap inte impulse response (IIR) filter in which the subject previous pixel is weighted by a factor of 0.5 and the subject current pixel is weighted by a factor of 0.5 and the weighted pixels are summed to form a lightly filtered pixel which is stored in filtered frame 814 in place of the subject current pixel.

After step 1006 or step 1010 or, if the pixel difference is greater than light threshold 804L, test step 1008, processing according to logic flow diagram 912, and therefore step 912 (FIG. 9), completes.

The IIR filters of heavy filter 812 (FIG. 8) and light filter 810 are particularly effective in removing noise from digital video signals. First, IIR filters provide smoothing over a potentially infinite number of previous frames since the subject previous pixel could have been filtered using a corresponding pixel of a frame preceding the reconstructed previous frame and that corresponding pixel could have been similarly temporally filtered and so on. Second, filters 810 and 812 filter the subject current pixel more aggressively than do filters typically used in conventional systems. To avoid temporally blurring the digital video signal by such aggressive, heavy filtering, the determination of whether the subject current and previous blocks and the subject current and previous pixels represent the same subject matter by pixel comparator 808 must be accurate. The accuracy of such a determination is significantly improved by the removal of impulse noise and other noise by spatial filter 202 (FIG. 2) prior to filtering by temporal filter 204. In addition, DC shifting noise, which is relatively common in digital video signals stored on old or low quality video tape or recorded to or retrieved from video tape using dirty or low quality tape heads and which is characterized by rapid lightening or darkening of successive frames of the motion video image, is effectively removed by temporal filter 204. Specifically, such lightening or darkening is sufficiently small between successive frames that heavy filter 812 (FIG. 8) of temporal filter 204 effectively removes any DC shifting noise which is visible in the digital video signal on those portions of the digital video signal in which the same subject matter is represented in successive frames.

The result of the combination of spatial filter 202 (FIG. 2) and temporal filter 204 is that the motion video image is significantly improved without losing any significant sharpness or clarity. The relatively small block size used by spatial filter 202 along with the adaptive application of spatial filtering preserves edges in the represented subject matter of the digital video signal. At the same time, removal of impulse and other noise by application of heavy spatial filtering where appropriate and further removal of noise by relatively heavy temporal filtering where appropriate combine to improve clarity substantially. Temporal filter 204 can effectively remove noise from portions of the digital video signal which represents highly detailed subject matter provided the same highly detailed subject matter is represented by previous frames.

Such significantly improves the performance of compression of the digital video signal by digital video signal encoder 100 (FIG. 1). Since the digital video signal has improved clarity, artifacts of video signal compression are reduced. In addition, the amount of data required to represent the encoded digital video signal can be reduced significantly, e.g., by as much as one-half, without sacrificing motion video image quality.

Inclusion of Video Signal Compressor in a Computer System

Figure 11:
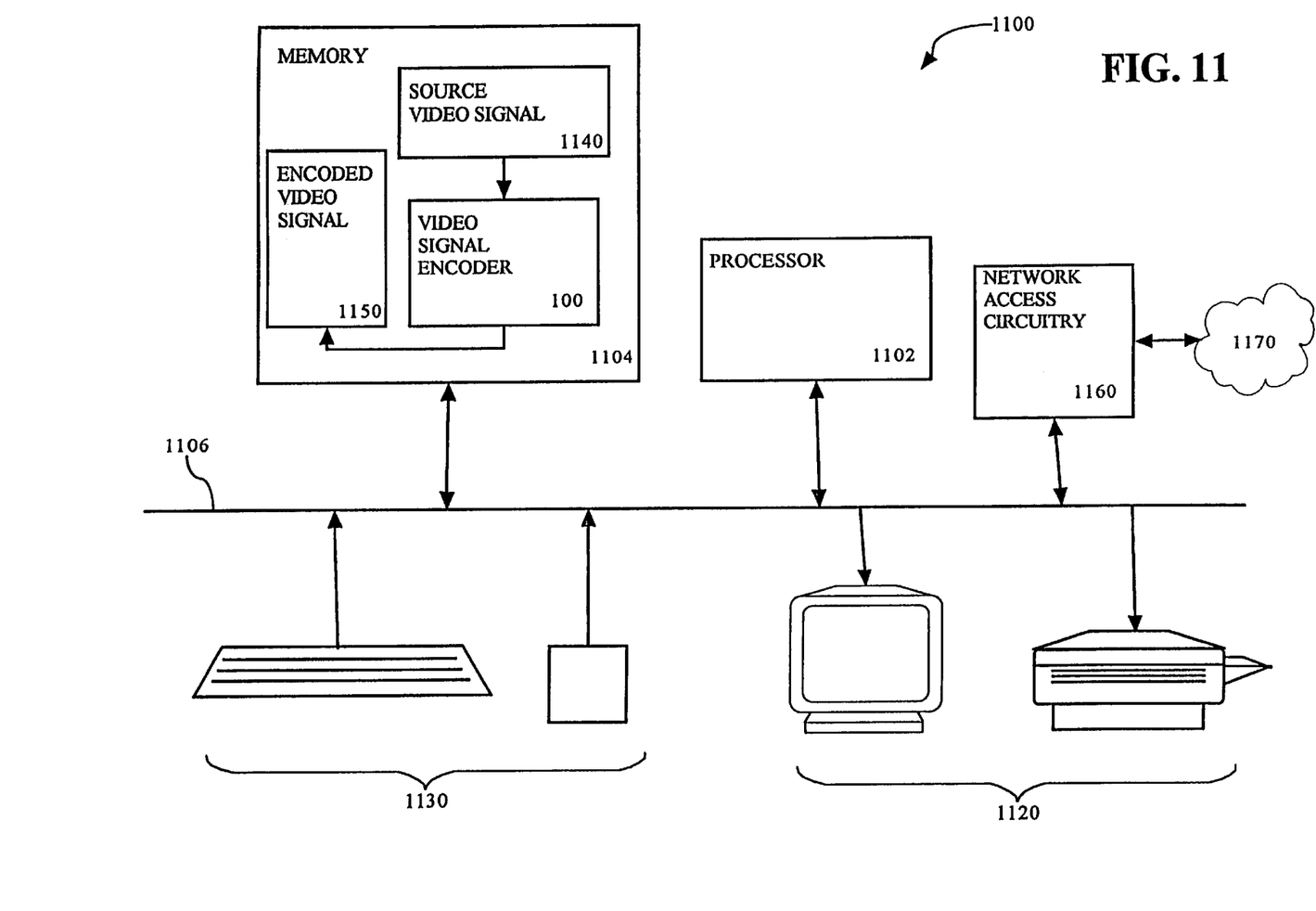
FIG. 11 is a block diagram of a computer system in which the video signal encoder of FIG. 1 operates.

In one embodiment, video signal encoder 100 (FIG. 1) is implemented in a computer system. In particular, computer system 1100 (FIG. 1) includes a processor 1102 and memory 1104 which is coupled to processor 1102 through an interconnect 1106. Interconnect 1106 can be generally any interconnect mechanism for computer system components and can be, e.g., a bus, a crossbar, a mesh, a torus, or a hypercube. Processor 102 fetches from memory 1104 computer instructions and executes the fetched computer instructions. In addition, processor 1102 can fetch computer instructions through a computer network 1170 through network access circuitry 1160 such as a modem or ethernet network access circuitry. Processor 1102 also reads data from and writes data to memory 1104 and sends data and control signals through interconnect 1106 to one or more computer display devices 1120 and receives data and control signals through interconnect 1106 from one or more computer user input devices 1130 in accordance with fetched and executed computer instructions.

Memory 1104 can include any type of computer memory and can include, without limitation, randomly accessible memory (RAM), read-only memory (ROM), and storage devices which include storage media such as magnetic and/or optical disks. Memory 1104 includes video signal encoder 100 which is all or part of a computer process which in turn executes within processor 1102 from memory 1104. A computer process is generally a collection of computer instructions and data which collectively define a task performed by computer system 1100.

Each of computer display devices 1120 can be any type of computer display device including without limitation a printer, a cathode ray tube (CRT), a light-emitting diode (LED) display, or a liquid crystal display (LCD). Each of computer display devices 1120 receives from processor 1102 control signals and data and, in response to such control signals, displays the received data. Computer display devices 1120, and the control thereof by processor 1102, are conventional.

Each of user input devices 1130 can be any type of user input device including, without limitation, a keyboard, a numeric keypad, or a pointing device such as an electronic mouse, trackball, lightpen, touch-sensitive pad, digitizing tablet, thumb wheels, or joystick. Each of user input devices generates signals in response to physical manipulation by a user and transmits those signals through interconnect 1106 to processor 1102.

As described above, video signal encoder 100 executes within processor 1102 from memory 1104. Specifically, processor 1102 fetches computer instructions from video signal encoder 100 and executes those computer instructions. Processor 1102, in executing video signal encoder 100, reads frames from source video signal 1140, processes and encodes those frames in the manner described above, and stored the encoded frames in encoded video signal 1150.

The above description is illustrative only and is not limiting. The present invention is limited only by the claims which follow.

What is claimed is:

1. A method for filtering at least a portion of a digital video signal, the method comprising:

calculating a pixel variance for a block of source pixels from a current frame of the motion video image;

applying a heavy spatial filter to the block of source pixels to form a block of spatially filtered pixels representing current subject matter of the current frame when the pixel variance is less than a first pixel variance threshold;

applying a light spatial filter to the block of source pixels to form the block of spatially filtered pixels when the pixel variance is less than a second pixel variance threshold;

calculating a pixel error between the block of spatially filtered pixels and a block of pixels of a previous frame of the digital video signal;

applying a heavy temporal filter to the block of spatially filtered pixels when the pixel error is less than a first pixel error threshold; and applying a light temporal filter to the block of spatially filtered pixels when the pixel error is less than a second pixel error threshold.

2. The method of claim 1 wherein the step of applying a light spatial filter comprises applying a five pixel median filter and a five pixel smoothing filter to the block of source pixels, and further wherein the step of applying a heavy spatial filter comprises applying a five pixel median filter and a nine pixel smoothing filter to the block of source pixels.

3. The method of claim 1 wherein the calculated pixel error is an absolute pixel difference.

4. A computer readable medium useful in association with a computer which includes a processor and a memory, the computer readable medium including computer instructions which are configured to cause the computer to filter a digital video signal by performing the steps of:

calculating a pixel variance for a block of source pixels from a current frame of the motion video image;

applying a heavy spatial filter to the block of source pixels to form a block of spatially filtered pixels representing current subject matter of the current frame when the pixel variance is less than a first pixel variance threshold;

applying a light spatial filter to the block of source pixels to form the block of spatially filtered pixels when the pixel variance is less than a second pixel variance threshold;

calculating a pixel error between the block of spatially filtered pixels and a block of pixels of a previous frame of the digital video signal;

applying a heavy temporal filter to the block of spatially filtered pixels when the pixel error is less than a first pixel error threshold; and applying a light temporal filter to the block of spatially filtered pixels when the pixel error is less than a second pixel error threshold.

5. The computer readable medium of claim 4 wherein the step of applying a light spatial filter comprises applying a five pixel median filter and a five pixel smoothing filter to the block of source pixels, and further wherein the step of applying a heavy spatial filter comprises applying a five pixel median filter and a nine pixel smoothing filter to the block of source pixels.

6. The computer readable medium of claim 4 wherein the calculated pixel error is an absolute pixel difference.

7. A computer system comprising:

a processor, a memory operatively coupled to the processor; and a digital video signal filter which executes in the processor from the memory and which, when executed by the processor, causes the computer to filter a digital video signal by performing the steps of:

calculating a pixel variance for a block of source pixels from a current frame of the motion video image;

applying a heavy spatial filter to the block of source pixels to form a block of spatially filtered pixels representing current subject matter of the current frame when the pixel variance is less than a first pixel variance threshold;

applying a light spatial filter to the block of source of pixels to form the block of spatially filtered pixels when the pixel variance is less than a second pixel variance threshold;

calculating a pixel error between the block of spatially filtered pixels and a block of pixels of a previous frame of the digital video signal;

applying a heavy temporal filter to the block of spatially filtered pixels when the pixel error is less than a first pixel error threshold; and applying a light temporal filter to the block of spatially filtered pixels when the pixel error is less than a second pixel error threshold.

8. The computer system of claim 7 wherein the step of applying a light spatial filter comprises applying a five pixel median filter and a five pixel smoothing filter to the block of source pixels, and further wherein the step of applying a heavy spatial filter comprises applying a five pixel median filter and a nine pixel smoothing filter to the block of source pixels.

9. The computer system of claim 7 wherein the calculated pixel error is an absolute pixel difference.

10. The computer system of claim 7 wherein the step of comparing comprises:

measuring a difference between the block of spatially filtered pixels and the block of pixels of the previous frame; and determining whether the block of pixels of the previous frame represents the current subject matter by comparison of the measured difference to a predetermined threshold.

11. The method of claim 1, wherein the step of applying a heavy temporal filter includes applying a two-tap infinite impulse response filter in which the pixels of the previous frame are weighted by a factor of substantially equal to 0.75, and further wherein the step of applying a light temporal filter includes applying a two-tap infinite impulse response filter in which the pixels of the previous frame are weighted by a factor of substantially equal to 0.5.

12. The computer readable medium of claim 4, wherein the step of applying a heavy temporal filter includes applying a two-tap infinite impulse response filter in which the pixels of the previous frame are weighted by a factor of substantially equal to 0.75, and further wherein the step of applying a light temporal filter includes applying a two-tap infinite impulse response filter in which the pixels of the previous frame are weighted by a factor of substantially equal to 0.5.

13. The computer system of claim 7, wherein the step of applying a heavy temporal filter includes applying a two-tap infinite impulse response filter in which the pixels of the previous frame are weighted by a factor of substantially equal to 0.75, and further wherein the step of applying a light temporal filter includes applying a two-tap infinite impulse response filter in which the pixels of the previous frame are weighted by a factor of substantially equal to 0.5.

* * * * *

UNITED STATES PATENT AND TRADEMARK OFFICE
CERTIFICATE OF CORRECTION

PATENT NO.     : 6,281,942 B1  
DATED          : August 28, 2001  
INVENTOR(S)    : Wang

It is certified that error appears in the above-identified patent and that said Letters Patent is hereby corrected as shown below:

Column 12,
Line 28, replace "inte" with -- infinite --.

Column 15,
Line 32, delete "of" after "source".

Signed and Sealed this

Eleventh Day of February, 2003

JAMES E. ROGAN
*Director of the United States Patent and Trademark Office*